UNITED STATES PATENT OFFICE 2,556,271

MANUFACTURE OF ACETIC ACID

Walter Henry Groombridge, Spondon, near Derby, England, assignor to Celanese Corporation of America, a corporation of Delaware No Drawing. Application September 30, 1947, Serial No. 777,127. In Great Britain October 16, 1946

2 Claims. (Cl. 260—541)

This invention relates to the manufacture of organic compounds and is more particularly concerned with the manufacture of acidyl compounds and especially carboxylic acids.

According to the invention, carboxylic acidyl compounds are produced by subjecting halogenated hydrocarbons to reaction with carbon monoxide in presence of a metal carbonyl. The invention is of special importance in connection with the manufacture of acetic acid from methyl chloride.

In carrying out the process of the invention, the halogenated hydrocarbon may be brought into reaction with nickel carbonyl itself the carbonyl providing the necessary carbon monoxide, or with carbon monoxide in presence of nickel carbonyl or a nickel halide, e. g. the iodide or chloride, especially a hydrate such as $NiI_2.6H_2O$, or nickel in some other form in which it readily forms a carbonyl. Mixtures equivalent to a nickel halide may be used, e. g. nickel together with copper iodide.

Nickel carbonyl is the preferred agent to be employed in the process of the invention, since it in general gives much more satisfactory results than other carbonyls, although cobalt carbonyl may if desired be employed and gives better results than iron carbonyl.

The reaction involved is one which is favoured by super-atmospheric pressure and, while the pressure employed may be of the order of 40/50 atmospheres, preferably substantially higher pressures than this are employed, for example, 100/200 atmospheres, while even higher pressures, e. g. up to 500 atmospheres may be used if desired with advantage that a smaller plant can be used for a given output. The reaction temperature used depends somewhat upon the pressure under which the reactants are employed and also, to some extent, upon the exact nature of the substances used. With methyl chloride as starting material reaction temperatures of 250–350° C. are suitable and even higher temperatures can be used. With methyl iodide good results are obtained at 200° C. and even lower temperatures, e. g. 180° C., can be used. With halogenated hydrocarbons containing more than one carbon atom it is usually possible to work at lower temperatures than with methyl halides, and in general with iodides it is possible to work at lower temperatures than with chlorides or bromides, and with bromides to work at slightly lower temperatures than with chlorides. The presence of a little iodine improves the conversion obtained with chlorinated and brominated hydrocarbons. Thus, when using methyl chloride as starting material, a little methyl iodide, iodine, hydrogen iodide or nickel iodide may be introduced into the reaction zone. Quite a small quantity of iodine employed in this way produces a beneficial effect, e. g. between ½ and 1½ molecular proportions per 100 molecular proportions of methyl chloride have been found to give a substantially increased conversion.

The presence of water appears to be essential in order to cause carbon monoxide and methyl chloride to react, and results in the production of acetic acid. It is preferred to employ a quantity of water at least equal to that theoretically required for the conversion of the methyl chloride to acetic acid, assuming intermediate formation of acetyl chloride, by the addition of carbon monoxide to the methyl chloride, and its hydrolysis to acetic acid. Preferably rather more water than this is used, for example 2-3 molecular proportions of water for each molecular proportion of methyl chloride. Similar considerations apply to the production of carboxylic acids from halogenated hydrocarbons containing more than one carbon atom, e. g. the production of propionic acid from propyl chloride, butyric acid from butyl chloride, adipic acid from 1.4-dichlor-butane, and other mono- and dicarboxylic acids from the corresponding halogenated hydrocarbons.

The proportion of carbon monoxide to halogenated hydrocarbon is preferably rather more than the equimolecular proportions theoretically required. Thus, 2-4 or more molecular proportions of carbon monoxide may be employed for each molecular proportion of halogenated hydrocarbon.

The reaction may be carried out under acid conditions although this does not appear to be essential. While an inorganic acid, for example hydrochloric acid, may be present, organic acids can also be used, and acetic acid is to be preferred where it is the product of the process.

Methyl chloride to be used in the process of the invention may be obtained by the chlorination of methane with chlorine itself. Preferably, however, methane is reacted with a mixture of hydrogen chloride and oxygen or air in presence of a catalyst such as cuprous chloride, which favours the production of chlorine from hydrogen chloride and oxygen. In this way, the chlorine needed for the production of methyl chloride is produced continuously with its utilization. Preferably, a large excess of methane over that theoretically required is employed, so as to suppress the formation of chlorination products containing a greater proportion of chlorine than methyl chloride. It is, however, unnecessary for the purposes of the invention to employ pure methyl chloride, as mixtures of this compound with other chlorinated hydrocarbons may be used, although in some cases they may themselves undergo reaction. For example, methylene chloride tends to undergo hydrolysis with the formation of formaldehyde.

Chlorinated or other halogenated hydrocarbons containing more than one carbon atom may be used as starting materials in the process of the invention, and these may be obtained in a manner similar to that used for the production of methyl chloride. For the production of propionyl values, e. g. propionic acid, however, ethyl chloride may be obtained by reacting ethylene with hydrogen chloride, for example by passage over a catalyst comprising zinc chloride. It will be appreciated that the process of the invention provides a relatively cheap route for the production from relatively inexpensive hydrocarbons of much more valuable acidyl compounds.

The following example illustrates the invention as applied to the production of acetic acid from methyl chloride:

*Example*

An autoclave is charged with the following ingredients in the stated weights for each litre of reaction volume:

| | Grams |
|---|---|
| Methyl chloride | 65 |
| Water | 20–30 |
| Nickel carbonyl | 105–110 |
| Iodine | 2 |

Carbon monoxide to a total pressure of 110 atmospheres at room temperature.

The autoclave is heated to 330° C., the pressure rising as a result to 350–450 atmospheres, and is maintained at reaction temperature for 1¼ hours, after which it is cooled to room temperature. The final pressure in the autoclave is 90–95 atmospheres.

The gases remaining in the autoclave are vented through cooling and scrubbing towers to recover the volatile materials.

Apart from unchanged starting materials, the liquid products contain acetic acid together with a little methyl acetate, while the gaseous products include a little dimethyl ether. The acetic acid and methyl acetate together repreesnt a conversions of the methyl chloride approaching 50%.

Having described my invention, what I desire to secure by Letters Patent is:

1. Process for the production of acetic acid, which comprises subjecting methyl chloride to reaction with carbon monoxide at a temperature of between 180° and 350° C. under a total pressure of between 100 and 500 atmospheres and in the presence of water, nickel carbonyl and methyl iodide.

2. Process for the production of acetic acid, which comprises subjecting methyl chloride to reaction with carbon monoxide at a temperature of between 180° and 350° C. under a total pressure of between 100 and 500 atmospheres and in the presence of water, nickel carbonyl and methyl iodide, the amount of methyl iodide employed being sufficient to supply between ½ and 1½ molecular proportions of iodine per 100 molecular proportions of methyl chloride.

WALTER HENRY GROOMBRIDGE.

REFERENCES CITED

The following references are of record in the file of this patent:

UNITED STATES PATENTS

| Number | Name | Date |
|---|---|---|
| 1,911,589 | Steinhauser | May 30, 1933 |
| 2,053,233 | Woodhouse | Sept. 1, 1936 |
| 2,062,344 | Wiezevich et al. | Dec. 1, 1936 |

OTHER REFERENCES

Dupont, Chem. Abstracts, vol. 31, col. 6838 (1937).

Peck et al., Interview with Dr. J. W. Reppe, Fiat Final Report #273, pp. 8–12 (Oct. 1945).

Reppe, German Plastics Practice, Debell and Richardson, Springfield, Massachusetts (Quartermaster Reports) pp. 516–517 (1946).